United States Patent Office 2,784,210
Patented Mar. 5, 1957

2,784,210

CLEAVAGE OF POLYSULFONES

Gene M. LeFave, Indianapolis, Ind.

No Drawing. Application October 21, 1953,
Serial No. 387,530

17 Claims. (Cl. 260—464)

This invention relates to the cleavage of polysulfones and, particularly, to the production of useful compositions from polysulfones. Included in the products of the invention are new compositions possessing advantageous adhesive properties.

In recent years considerable interest has been aroused in the polysulfones produced from reaction of sulfur dioxide with unsaturated hydrocarbons that are normally by-products from petroleum refinery operations. The mild reaction conditions, high yield of product, and low cost of the starting materials render such a process potentially very attractive. Unfortunately, the products are sensitive to alkaline reagents and exhibit a tendency toward decomposition at the temperatures required for molding into useful forms.

It is an object of this invention to utilize readily available polysulfones in the manufacture of useful products.

Another object is to convert polysulfones to useful products by reaction with polar compounds, particularly inorganic reagents.

A further object is to cleave polysulfones to produce compositions useful in various direct applications, such as in adhesive compositions, and as intermediates in the preparation of other products in demand.

An additional object is to provide new compositions, particularly resinous compositions, having valuable properties and numerous uses.

These and other objects and advantages of the invention will be apparent on consideration of the following description.

In accordance with the invention, a process is provided which involves reacting a high molecular weight polysulfone with a polar compound other than a basic hydroxide, preferably an inorganic reagent, to cleave the polysulfone.

Also provided are new compositions having properties rendering them useful in a number of ways. One such composition, useful as an adhesive, is obtained by reacting a high molecular weight butene-1-polysulfone with a source of hydrosulfide ions. Another useful adhesive composition is produced by reacting a high molecular weight butene-1-polysulfone with a source of sulfide ions.

The polysulfones are well known and include products resulting from the combination of a divalent organic radical and sulfur dioxide in equimolecular proportions. Especially suitable are the polysulfones resulting from the combination of an unsaturated hydrocarbon and sulfur dioxide. The hydrocarbon may be unsubstituted or substituted with a radical inert in the reaction, such as by replacement of hydrogen with hydroxyl or halogen. The polysulfones involved are linear polymers of high molecular weight, e. g., of the order of 50,000 or higher and usually falling in the range of 50,000 to 200,000, on the basis of end-group analysis and viscosity of solutions. They contain a recurring structural unit of the type $(-R-SO_2-R-SO_2-)_n$ where R is a divalent organic radical, including olefinic and acetylenic radicals. The polysulfones include copolymers, wherein different divalent organic radicals are present in one polymer in combination with $SO_2$ radicals.

The polysulfones may be prepared by one or more of the known methods, such as those described in U. S. Patents 2,045,592, 2,114,292, 2,138,584, 2,201,544, 2,241,900 or 2,201,884. Among the compounds from which the polysulfones are prepared are monoolefins, such as ethylene, propylene, 1- and 2-butenes, 1-pentene, isopropyl ethylene, 1-hexene, allyl alcohol, allyl chloride, vinyl chloride, styrene, decylenic acid, and cyclohexene; diolefins such as 1,3-butadiene; and acetylenic compounds such as butyne-1, heptyne-1 and 3-cyclohexyl-propyne-1.

The preferred polysulfones are those derived from the monoolefins and are thus ethylene polysulfones, i. e., polysulfones having the recurring unit

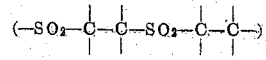

there being hydrogen or other mono- or divalent radicals inert in the reaction joined to the carbon atoms, including alkyl or aryl radicals, cycloalkyl residues, or halo or hydroxyl radicals.

Various products are obtained by reacting the polysulfones with polar compounds other than the basic hydroxides. The inorganic reagents are preferred polar compounds, providing compositions useful in themselves and as intermediates, such as resinous materials, sulfinic acids, nitriles, mercaptans, amines and glycols. Especially suitable reagents include those providing sources of cyanide ions, hydrosulfide ions, sulfide ions, thiocyanide ions, cyanate ions, acetate ions, nitrite ions, ammonia, and others. The foregoing terms are meant to include the respective isomeric forms, including isocyanide, isothiocyanide, and isocyanate. The ionic reagents are preferred and of these, an especially preferred group includes the inorganic compounds MCN, MSH, $MC_2H_3O_2$, $M_2S$, MX, MCNS, MCNO, and $MNO_2$, including the isomeric forms, where M is an alkali or alkaline earth metal, ammonium or hydrogen and X is halogen. Of these, the compounds having a basic reaction in aqueous solution are particularly suitable.

The polysulfones and the polar compound are reacted together in aqueous or non-aqueous media, the latter preferably being a polar solvent. The aqueous reaction mixtures tend to produce increased degradation of the polysulfones and to enhance the production of sulfinic acids and alcohols. The non-aqueous media also tend to produce sulfinic acids while cleavage products, for example, nitriles, mercaptans, thiocyanides, and so forth, are formed by the addition to the polysulfone fragments of the anion employed. For the most advantageous production of the latter compounds, the reaction mixture should be completely free of water.

The reaction may be carried out in diverse ways and under differing conditions. For example, a polysulfone may be reacted with anhydrous hydrogen cyanide under heat and pressure, and this reaction may also be carried out in the presence of an alkali metal cyanide. A polysulfone may be reacted with cuprous cyanide in pyridine. A polysulfone may be reacted with an alkali metal cyanide in an anhydrous polar organic solvent, such as dioxane, or the polysulfone and the cyanide may be reacted by fusion. A polysulfone may be reacted with alkali metal hydrosulfide, aqueous media producing excellent plant stickers for insecticides and adhesive materials while non-aqueous media result in the formation of monomeric mercaptans. Amine formation takes place by reaction of the polysulfones with ammonia. Other reagents give corresponding products, and in the various reactions, sulfinic acids are produced.

Exemplary of the invention is the reaction of butene-1-polysulfone with an alkali metal cyanide in anhydrous dioxane, or with hydrogen cyanide in the presence of an alkali metal cyanide. A product of the reaction is 1,2-dicyanobutane. Another example is the reaction of cyclohexene polysulfone with an alkali metal cyanide in a non-aqueous medium to produce 1,2-dicyanocyclohexane. The nitriles are produced by heating the reactants together at a moderately superatmospheric temperature, e. g., 40–100° C., for a period of time sufficient to effect the reaction, preferably several hours. The nitriles are advantageously converted to acids by hydrolysis.

A useful resinous product is prepared by reacting a high molecular weight polysulfone with alkali metal cyanide, in aqueous or aqueous alcoholic solution. About an equivalent amount by weight of alkali metal cyanide is mixed with the polysulfone, and the mixture is heated to about 40–100° C. Reaction takes place rapidly, in a matter of minutes. In some cases, the reaction requires no supply of heat, taking place at about room temperature (20–25° C.). When the sulfone is dissolved, the product is isolated by evaporation of the solvent. The residue contains a water-soluble resin insoluble in organic solvents.

In another embodiment of the invention, a polysulfone is reacted with an alkali metal hydrosulfide in aqueous-alcoholic medium. About one to two parts by weight of the hydrosulfide are mixed with the sulfone, and the mixture is heated moderately to start the reaction which then proceeds without further heating. The reaction produce from butene-1-polysulfone thus obtained is an oil which has pronounced adhesive properties, increasing on standing in air.

When a polysulfone is reacted with an alkali metal hydrosulfide in an anhydrous alcoholic medium, a monomeric mercaptan is formed which may be converted to an elastomer by oxidation followed by curing. In this case also, little or no external heat need be supplied for the cleavage.

It has also been found that the high molecular weight polysulfones, particularly ethylene polysulfones, can be converted to useful products of the above types in a two-stage process involving degradation of a polysulfone with an alkali, for example, an alkali metal hydroxide, to a lower polysulfone, followed by treatment of the reaction product with another polar compound as described above. Thus, for example, a high molecular weight ethylene polysulfone is reacted with an alkali metal hydroxide under mild reaction conditions, such as in a cold, dilute aqueous solution of the base, to give a product containing a cyclic disulfone. The reaction product is reacted with a source of cyanide ions to produce a nitrile which may be converted to a carboxylic acid, the latter in the same operation if desired. Similarly, other of the above-described reagents, such as those providing sources of cyanide, hydrosulfide, sulfide, thiocyanide, cyanate, acetate and nitrite ions, and ammonia, may be reacted in place of those providing sources of cyanide ions.

To illustrate the invention, the following examples are furnished. It is to be understood that the invention is not limited to these examples nor to the particular proportions, components and conditions set forth therein, which are given for purposes of illustration only.

EXAMPLE 1

Butene-1-polysulfone was mixed with potassium cyanide in either a 10% aqueous or 7% ethanolic solution (containing a small amount of water) of the cyanide. Ten grams of the polysulfone was suspended in the solution containing 10 grams of cyanide. The mixture was heated to 60–80° C. until the sulfone dissolved, which required about one-half hour. The solution was then evaporated to dryness and the residue was extracted with absolute ethanol. The residue remaining after extraction of the product of the reaction run in aqueous solution was an amber to dark brown water-soluble resin insoluble in organic solvents. The residue remaining after extraction of the product of the reaction run in alcoholic solution was a hygroscopic powder which on standing in air became sticky and resembled the aqueous solution end product; it was likewise water-soluble and organic solvent-insoluble.

EXAMPLE 2

The method of Example 1 was repeated, with the substitution of allyl alcohol polysulfone for butene-1-polysulfone. In this case, the reaction took place at room temperature, and the sulfone dissolved in about an hour. Similar resinous products were produced.

EXAMPLE 3

Butene-1-polysulfone was reacted with sodium hydrosulfide in aqueous isopropanol. The reaction conditions are given in Table I.

*Table I*

| Run No. | Butene-1-polysulfone (g.) | Isopropanol (98%) (ml.) | Sodium Hydrosulfide, dihydrate (g.) | Reaction time (hr.) | Oily product (g.) |
|---|---|---|---|---|---|
| 1 | 120 | 850 | 200 | 16 | ª 69 |
| 2 | 120 | 1,000 | 150 | 16 | ª 85 |
| 3 | 240 | 2,000 | 300 | 24 | 204 |
| 4 | 240 | ᵇ 2,000 | 300 | 12 | 190 |

ª Only the isopropanol-soluble fraction was acidified.
ᵇ 300 ml. of water added.

The reaction mixture was heated to 40–60° C. to start the reaction, which proceeded exothermically and requiring no cooling. An hydrogensulfide atmosphere was provided, at atmospheric pressure.

At the end of the reaction, the product was acidified to a pH of about 3–5. In runs 1, 2 and 3, a heavy slurry resulted. The isopropanol fraction was separated in runs 1 and 2 and acidified, and the entire mixture was acidified in run 3. In run 4, two clear liquid phases were present, and the entire mixture was acidified.

In each case, an oily product separated in the mixture and was isolated. This oil has pronounced adhesive properties which increase on standing in air, the oil slowly becoming base-insoluble and propressively less soluble in organic solvents on standing.

EXAMPLE 4

To a heavy-walled drawn out Pyrex tube was added 0.5 gram of potassium cyanide and 10 grams of butene-1-polysulfone. The tube was cooled in acetone-Dry Ice, and 17.8 grams of hydrogen cyanide was added. The tube was sealed in a flame and placed in an iron pipe, the ends of which were closed with standard fittings. The pipe was immersed in a water bath and heated at 95° C. for 5 hours.

After stripping the hydrogen cyanide, the residue was extracted with ethyl acetate. Evaporation of the solvent from the extract gave a light brown powder. This powder was extracted with water, and the aqueous extract was mixed with an equal weight of concentrated sulfuric acid. This solution was then refluxed for several hours, cooled, the resultant precipitate filtered and recrystallized from benzene. The product was ethylsuccinic acid, M. P. 96–97° C. The water-extracted powder appeared to contain an ethylacrylonitrile polymer.

EXAMPLE 5

An anhydrous solution of sodium hydrosulfide in methanol was agitated while a methanol solution of butene-1-polysulfone was added. After 3 hours stirring, the solution was refluxed for one-half hour. The solution was then acidified and the resultant oil separated.

An aqueous emulsion was prepared from this oil using Santomerse I sodium alkylaryl sulfonate as the emulsifying agent. A catalytic amount of ferric chloride was added to the emulsion, and air was bubbled into the suspension for 48 hours. The resultant viscous suspension was acidified, and the resultant soft rubbery mass was washed and dried. It was cured to a rather resilient, extensible tough rubber by the addition of a suspension of lead peroxide in dioctyl phthalate and slight heating (40–45° C.) for 10 hours.

EXAMPLE 6

Five grams of propylene polysulfone was dissolved in cold dilute aqueous sodium hydroxide solution. This solution was acidified, to give the cyclic disulfone

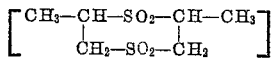

The product was refluxed in aqueous 40% potassium cyanide solution for 15 hours. Upon acidification, a dibasic carboxylic acid presumed to be methylsuccinic acid, an alkali-soluble resin, and an alkali-insoluble resin were obtained.

There is thus provided by the invention a new process which makes very advantageous use of the available high molecular weight polysulfones, cleaving them to numerous products including certain new compositions. The products are produced in a simple and direct manner, without necessity for complicated reactions, to furnish a new and plentiful source of supply.

The invention is hereby claimed as follows:

1. The process which comprises reacting a high molecular weight polysulfone with an inorganic reagent selected from the class consisting of $M(CN)_n$ and $M(SH)_n$, wherein M is selected from the class consisting of alkali metal, alkaline earth metal, ammonium and hydrogen, and $n$ is the valence of M, to cleave the polysulfone.

2. The process which comprises reacting a high molecular weight polysulfone in a non-aqueous medium with an inorganic reagent selected from the class consisting of $M(CN)_n$ and $M(SH)_n$, wherein M is selected from the class consisting of alkali metal, alkaline earth metal, ammonium and hydrogen, and $n$ is the valence of M, to cleave the polysulfone and produce an addition product of a polysulfone fragment and the anion of said inorganic reagent.

3. The process which comprises reacting a high molecular weight polysulfone with an inorganic cyanide to cleave the polysulfone.

4. The process which comprises reacting a high molecular weight polysulfone with an inorganic cyanide in a non-aqueous medium to cleave the polysulfone and produce a nitrile cleavage product thereof.

5. The process which comprises reacting a high molecular weight polysulfone with an alkali metal cyanide in a non-aqueous medium to cleave the polysulfone and produce a nitrile cleavage product thereof.

6. The process which comprises reacting a high molecular weight butene-1-polysulfone with an alkali metal cyanide to cleave the polysulfone.

7. The process which comprises reacting a high molecular weight allyl alcohol polysulfone with an alkali metal cyanide to cleave the polysulfone.

8. The process which comprises reacting a high molecular weight cyclohexene polysulfone with an alkali metal cyanide to cleave the polysulfone.

9. The process which comprises reacting a high molecular weight polysulfone selected from the group consisting of butene-1-polysulfone and cyclohexene polysulfone with an alkali metal cyanide in a non-aqueous medium to produce a dinitrile of the monomeric hydrocarbon.

10. The process which comprises reacting a high molecular weight butene-1-polysulfone with an inorganic cyanide in a non-aqueous medium to produce 1,2-dicyanobutane.

11. The process which comprises reacting a high molecular weight butene-1-polysulfone with hydrogen cyanide in a non-aqueous medium to produce 1,2-dicyanobutane.

12. The process which comprises reacting a high molecular weight butene-1-polysulfone with an alkali metal cyanide in a non-aqueous medium to produce 1,2-dicyanobutane.

13. The process which comprises reacting a high molecular weight cyclohexene polysulfone with an alkali metal cyanide in a non-aqueous medium to produce 1,2-dicyanocyclohexane.

14. The process which comprises reacting a high molecular weight polysulfone with an inorganic hydrosulfide to cleave the polysulfone.

15. The process which comprises reacting a high molecular weight butene-1-polysulfone with an alkali metal hydrosulfide to cleave the polysulfone.

16. The process which comprises reacting a high molecular weight butene-1-polysulfone with an alkali metal hydrosulfide in a non-aqueous medium to produce a monomeric mercaptan.

17. An adhesive composition obtained by reacting a high molecular weight butene-1-polysulfone with a source of hydrosulfide ions to cleave the polysulfone.

References Cited in the file of this patent

Frederick et al.: J. A. C. S., vol. 56, pp. 1815–19 (1934).
Glavis et al.: J. A. C. S., vol. 59, pp 707–11 (1937).
Suter: Organic Chemistry of Sulfur, 1944, pp. 758–9.